United States Patent [19]
Horvath et al.

[11] Patent Number: 5,450,599
[45] Date of Patent: Sep. 12, 1995

[54] SEQUENTIAL PIPELINED PROCESSING FOR THE COMPRESSION AND DECOMPRESSION OF IMAGE DATA

[75] Inventors: Thomas A. Horvath, Stormville; Norman H. Kreitzer, Yorktown Heights; Andy G.-C. Lean, Merrick; Thomas McCarthy, Peekskill, all of N.Y.

[73] Assignee: International Business Machines Corporation, Armonk, N.Y.

[21] Appl. No.: 894,312

[22] Filed: Jun. 4, 1992

[51] Int. Cl.6 .............................................. G06F 13/00
[52] U.S. Cl. ...................................... 395/800; 395/250
[58] Field of Search ...................... 348/404, 405, 408; 364/413.3; 382/56; 395/162, 164, 250, 400, 425, 775, 800

[56] References Cited

U.S. PATENT DOCUMENTS

| | | | |
|---|---|---|---|
| 4,376,588 | 3/1983 | Moeller | 400/322 |
| 4,480,314 | 10/1984 | McKelley, Jr. et al. | 364/900 |
| 4,646,075 | 2/1987 | Andrews et al. | 340/747 |
| 4,823,201 | 4/1989 | Simon et al. | 358/133 |
| 4,843,632 | 6/1989 | Lee et al. | 382/56 |
| 4,897,717 | 1/1990 | Hamilton et al. | 348/404 |
| 4,928,247 | 5/1990 | Doyle et al. | 364/518 |
| 4,949,280 | 8/1990 | Littlefield | 364/518 |
| 4,949,301 | 8/1990 | Joshi et al. | 364/900 |
| 4,984,076 | 1/1991 | Watanabe et al. | 348/405 |
| 4,985,766 | 1/1991 | Morrison et al. | 358/133 |
| 4,987,530 | 1/1991 | Wagner et al. | 364/200 |
| 5,007,100 | 4/1991 | D'Aoust et al. | 382/49 |
| 5,008,951 | 4/1991 | Koshi | 382/56 |
| 5,014,198 | 5/1991 | Umemera | 364/413.13 |
| 5,020,115 | 5/1991 | Black | 382/44 |
| 5,046,080 | 9/1991 | Lee et al. | 379/53 |
| 5,148,529 | 9/1992 | Ueda et al. | 395/375 |
| 5,185,599 | 2/1993 | Doornink et al. | 340/747 |

FOREIGN PATENT DOCUMENTS

| | | |
|---|---|---|
| 0425178A2 | 10/1990 | European Pat. Off. . |
| 54-136135 | 10/1979 | Japan . |
| 61-198988 | 9/1986 | Japan . |
| 63-107269 | 5/1988 | Japan . |
| 63-227276 | 9/1988 | Japan . |
| 63-276973 | 11/1988 | Japan . |
| 1-19479 | 1/1989 | Japan . |
| 1-64469 | 3/1989 | Japan . |
| 1-114985 | 5/1989 | Japan . |
| 2-123489 | 5/1990 | Japan . |
| 2211706A | 7/1989 | United Kingdom . |

OTHER PUBLICATIONS

L64740 DCT Quantization Processor (DCTQ) Preliminary Sep. 1990 (LSI Logic).
L64730 Discrete Cosine Transform Processor Preliminary Jul. 1990 (LSI Logic).

*Primary Examiner*—Alyssa H. Bowler
*Assistant Examiner*—Dan Fiul
*Attorney, Agent, or Firm*—Perman & Green

[57] ABSTRACT

A sequential process-pipeline has a first processing stage (30) coupled to a CODEC (24) through a plurality of buffers, including an image data input buffer (28), an image data output buffer (26), and an address buffer (34). The image data input buffer stores, for each block of image data, control information for controlling the processing of an associated block of image data. The address buffer stores addresses, each of which identifies an initial address of a block of addresses within an image memory (22). A local controller (18) is responsive to the writing of an address into the address buffer to read the control information for a block to be processed, and to initiate the operation of the CODEC, in accordance with the read-out information, to execute a Discrete Cosine Transformation Process and a Discrete Cosine Transformation Quantization Process.

30 Claims, 4 Drawing Sheets

SEQUENTIAL PIPELINED PROCESSING FOR THE COMPRESSION AND DECOMPRESSION OF IMAGE DATA

CROSS-REFERENCE TO RELATED PATENT APPLICATION

This patent application is related to commonly assigned U.S. patent application Ser. No. 07/894,121, filed Jun. 4, 1992, entitled "A Process-Pipeline Architecture for Image/Video Processing" by T. Horvath et al., now U.S. Pat. No. 5,289,577, issued Feb. 22, 1994.

FIELD OF THE INVENTION

This invention relates generally to serial, pipelined data processing systems and methods and, in particular, to processing systems that employ a serial, block orientated data stream.

BACKGROUND OF THE INVENTION

A problem that arises with the use of serial block oriented data processing techniques is in the interpretation of the serial data stream. The interpretation is used to determine the control signals that are required to process the serial data stream on a block by block basis.

For example, image processing algorithms typically operate on discrete portions of an image. Each discrete portion is referred to as a block of image data. However, in that multiple blocks can simultaneously exist in a processing pipeline, the supervision of pipeline control can represent a costly overhead factor to a host data processing system or to a dedicated co-processor.

Image compression and decompression (CODEC) techniques, such as those referred to as the Joint Photographic Experts Group (JPEG) and the Motion Picture Experts Group (MPEG), make use of a discrete cosine transform (DCT) function. These techniques divide an image into many small areas, referred to as blocks. The blocks are then processed sequentially within a process-pipeline that includes high speed hardware for implementing the DCT-related functions.

During the processing of such an image, it is often desirable to dynamically modify processing control parameters for the blocks.

It is thus an object of this invention to provide a technique for modifying block control parameters in a dynamic manner.

It is a further object of this invention to provide a technique that provides automatic flexible pipeline control on a per-block basis through the use and interpretation of the contents of a pipeline data buffer.

SUMMARY OF THE INVENTION

The foregoing and other problems are overcome and the objects of the invention are realized by an image processing system constructed with a process-pipeline architecture having a plurality of serially coupled computational routines or functions. Buffers, such as First In-First Out buffers (FIFOs), and a Local State Machine (LSM) are interposed between adjacent, serially coupled routines or functions.

In a presently preferred embodiment of this invention the data blocks are comprised of image data, and one of the processing stages executes a Discrete Cosine Transformation Process that generates coefficients, one of the processing stages executes a Discrete Cosine Transformation Quantization Process, and one of the processing stages executes a Process to reduce an entropy of the quantized Discrete Cosine Transformation coefficients. The processing stages operate in concert with one another to perform compression (encoding) and decompression (decoding) of the image data.

In the presently preferred embodiment, the first one of the processing stages is coupled to a second one of the processing stages through a plurality of buffers, including an image data input buffer, an image data output buffer, and an address buffer. The address buffer stores addresses, each of which identifies an initial address of a block of addresses within an image memory. Each block of addresses in the image memory stores a block of decompressed image data. The local controller is responsive to the writing of an address into the address buffer to initiate the operation of the processing stages that execute the Discrete Cosine Transformation Process and the Discrete Cosine Transformation Quantization Process.

In accordance with the teaching of the invention, each block of image data has block processing control information associated therewith. For an image data decoding process, a unit of processing control information and the associated block of image data are stored in a buffer, such as a First In-First Out (FIFO) buffer. Prior to decoding each block of image data, the control information unit is first extracted from the buffer and applied to data block processing circuitry, such as a DCT-based processor that implements the JPEG technique. The block of data is then applied to the data block processing circuitry, and the entire block is processed in accordance with the information expressed by the processing control unit.

For an image data encoding operation, blocks of uncompressed image data are stored in an image memory and the buffer stores, for each block of image data, a corresponding word or unit of processing control information. Responsive to an address being written into an address buffer, a first word of processing control information is read out and applied to image data compression circuitry. The address is read out so as to access a corresponding block of uncompressed image data. The block of image data is then compressed in accordance with the control information.

In both cases (image data compression or decompression) the sequentially buffered units of control information configure the processing circuitry to process an associated block of image data. Thus, an aspect of the invention teaches the commingling in a data buffer of data blocks, such as coefficient data, and associated processing control information for controlling the processing of each of the blocks. Each enqueued data block has an associated enqueued unit of processing control information.

BRIEF DESCRIPTION OF THE DRAWINGS

The above set forth and other features of the invention are made more apparent in the ensuing Detailed Description of the Invention when read in conjunction with the attached Drawings, wherein.

(a) shows an exemplary content of the Input FIFO of FIG. 1 for an image data decode operation.

(b) shows an exemplary content of the Input FIFO of FIG. 1 for an image data encode operation.

(c) shows an exemplary content of the Address FIFO of FIG. 1 for the image data encode operation of (a).

(d) shows an exemplary content of the Address FIFO of FIG. 1 for the image data encode operation of (b).

(e) shows an exemplary content of the Output FIFO of FIG. 1 for the image data encode operation of (b).

DETAILED DESCRIPTION OF THE INVENTION

Figure 1:
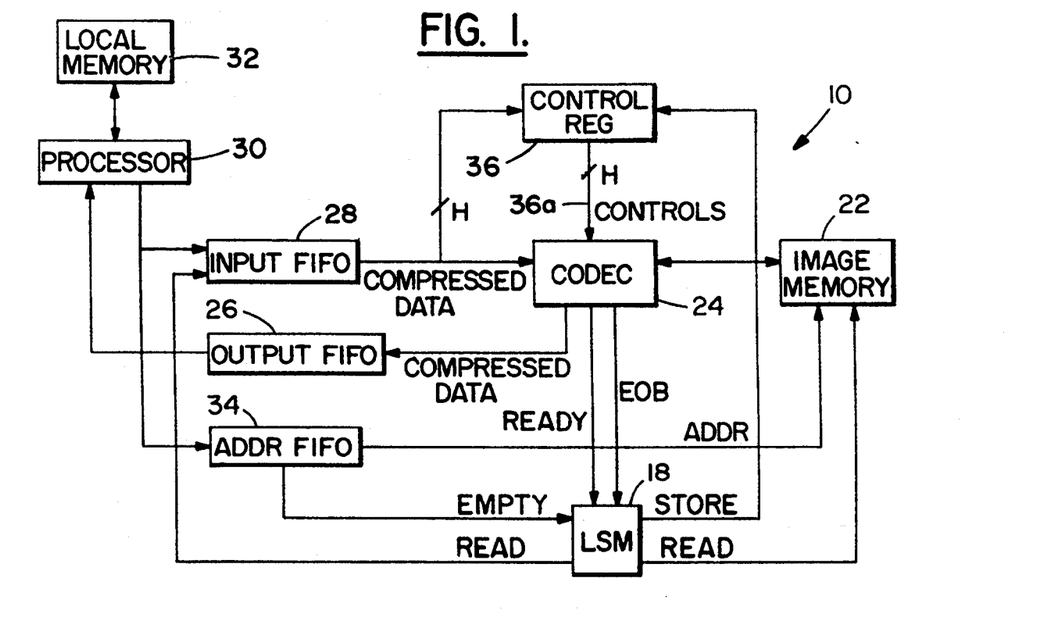
FIG. 1 is a simplified circuit block diagram showing an embodiment of an image data coding and decoding system that is constructed in accordance with the invention.

FIG. 1 is a simplified circuit block diagram showing an embodiment of an image data coding and decoding system 10 that is constructed in accordance with a process-pipeline architecture.

The purpose of the system is to perform compression (encoding) and decompression (decoding) of image data. For encoding, an image in an Image Memory 22 is passed to a Compression/Decompression (CODEC) device 24, and the resulting compressed data is placed in an Output FIFO 26 for subsequent storage. When decoding image data, compressed data in an Input FIFO 28 is passed to the CODEC 24, and the resulting decompressed data is stored in the Image Memory 22 for display and/or subsequent processing. A local Processor 30 is coupled between a local Memory 32 and the Output FIFO 26, the Input FIFO 28, and an Address FIFO 34. The Address FIFO 34 stores the initial addresses of blocks of decoded image data within the Image Memory 22, as described below.

In accordance with the invention, a Control Register 36 has an input coupled to the output of the Input FIFO 28 for receiving and storing data block Header (H) information. This Header information includes CODEC 24 control information.

In this embodiment of the invention the CODEC 24 processes the image data using a discrete cosine transform (DCT)-based compression/decompression technique. A presently preferred DCT approach is one based on the Joint Photographic Experts Group (JPEG) baseline, as described in ISO/IEC JTC1/SC2/WG8 CCITT SGVIII JPEG-8-R5.2 May 10, 1990. This technique first divides a source image into 8×8 blocks of image data, and then sequentially processes each of the blocks. The processing of a block of image data is shown in the symmetric logic flow diagram of FIG. 4.

Figure 4:
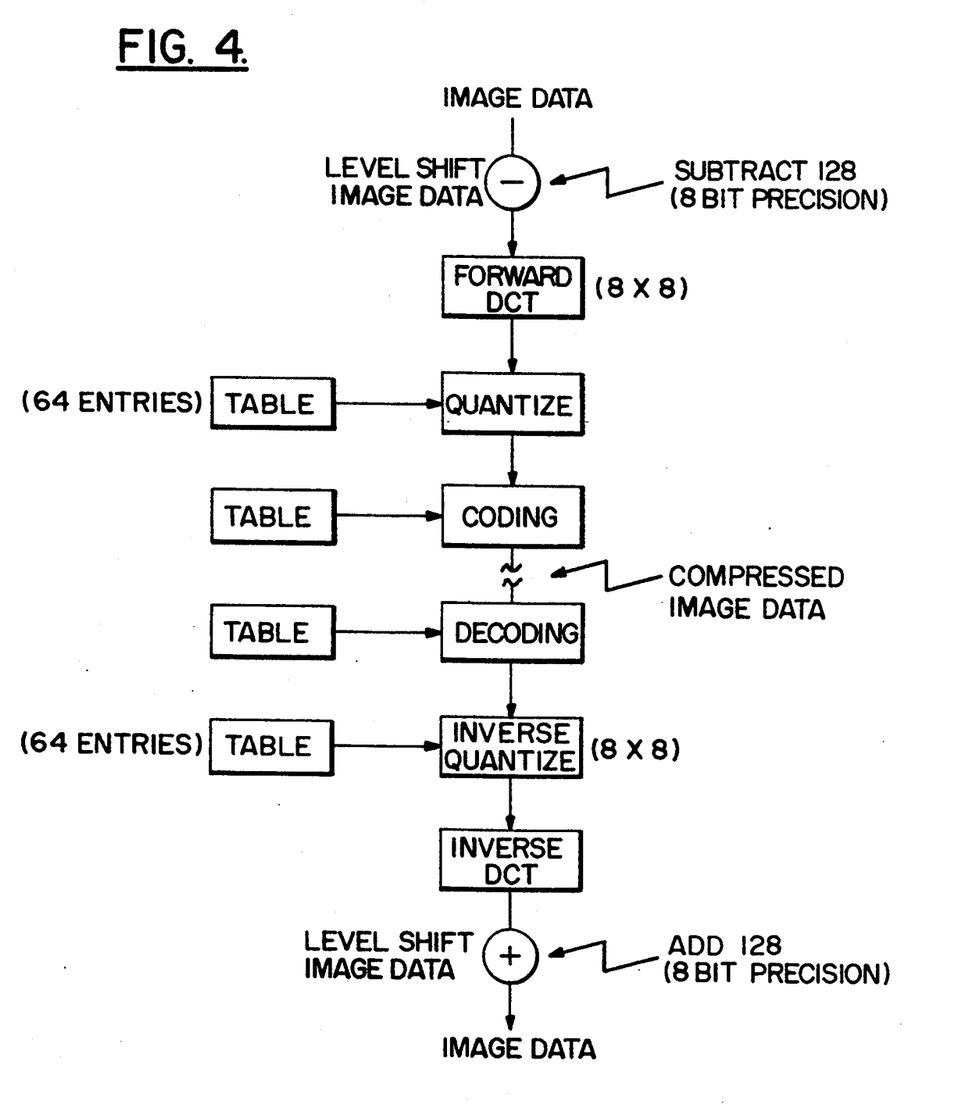
FIG. 4 is a logic flow diagram that illustrates a JPEG DCT (Joint Photographic Experts Group, Discrete Cosine Transform) -based image data coding model.

Prior to compression, image data is level shifted by subtracting 128 (8-bit precision). A DCT device processes blocks of 64 events and produces coefficients which are then quantized in accordance with a 64 entry lookup table of weights. The weights are based on a known response of the human eye to various frequencies. The result is a frequency dependent quantization which is then coded through a lossless entropy coding technique. Huffman variable length coding (VLC), as described by D. A. Huffman, "A Method for the Construction of Minimum-Redundancy Codes" Proc. IRE, September 1952, pp. 1098–1101, and run-length coding (RLC), as described by W. K. Pratt, Digital Image Processing, John Wiley & Sons, pp. 632, (1978), are two most-often employed lossless entropy coding techniques. Both of these techniques (VLC and RLC) take advantage of the fact that the stream of DCT coefficients frequently contains long runs of zeros.

Encode Processing

For encoding (compression), uncompressed source images are initially stored in the Image Memory 22. The Processor 30 first prepares the CODEC 24 for encode processing by first loading internal tables and initializing other necessary functions that are to remain fixed over a number of blocks of data. The Processor 30 also loads the Input FIFO 28 with a Header (H) for each block. The Processor 30 then loads the Address FIFO 34 with Image Memory 22 source addresses for each image data block to be processed.

The encode process is controlled by the LSM 18. Prior to initiating the encoding of a block of data, the LSM 18 reads the Input FIFO 28 to retrieve the block Header (H). The Header, containing CODEC 24 control information, is then stored in the Control Register 36 and applied to the CODEC 24.

FIG. 2(b) shows an exemplary content of the Input FIFO 28 for the image data encode operation. As can be seen, the Input FIFO 28 contains a plurality of Header Blocks, each of which includes CODEC 24 control information for an associated data block of image data that is stored in the Image Memory 22.

Figure 2:
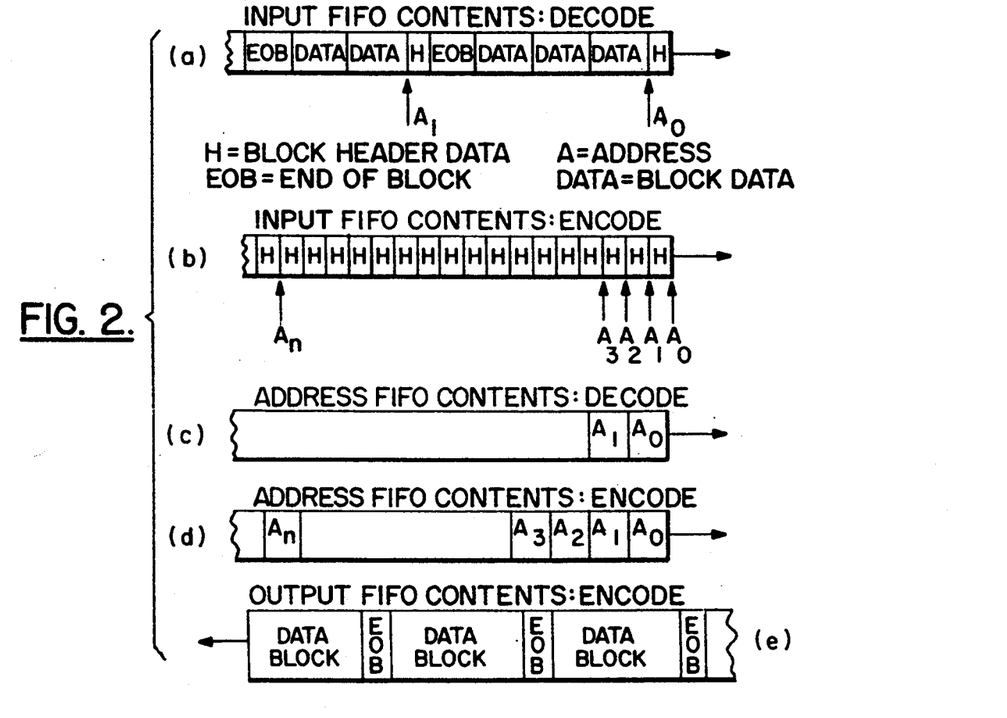
FIG. 2 shows the FIFO registers where.

FIG. 2(d) shows an exemplary content of the Address FIFO 34 of FIG. 2 for the Input FIFO 28 contents of FIG. 2(b). FIG. 2(e) shows an exemplary content of the Output FIFO of FIG. 2 during and after the image encoding operation.

After providing the Header Information for a block of image data to the Control Register 36, LSM 18 sends a read request to the Image Memory 22 to read a block of image data into the CODEC 24. The CODEC 24 encodes the image data block and passes the compressed image data to the Output FIFO 26 for subsequent retrieval by the Processor 30. When the CODEC 24 completes the compression of a full block of data, it generates an End of Block (EOB) signal to the LSM 18. In response, the LSM 18 repeats the above described operations by retrieving the Header information for the next image data block from the Input FIFO 28, if there are more blocks to be processed. The LSM 18 determines that there are more blocks to be processed by the presence of a further Image Memory 22 source address in the Address FIFO 34, as indicated by the state of the Address FIFO 34 EMPTY signal line.

Decode Processing

For decoding (decompression), compressed blocks of image data are placed in the Input FIFO 28 by the Processor 30. Each of the blocks has a Header associated therewith, the Header preceding the associated block of image data. The Processor 30 initiates and maintains a record of any required block control parameters. The Processor 30 also loads the Address FIFO 34 with Image Memory 22 target addresses for each image data block to be processed. The decode process is controlled by the LSM 18. Prior to initiating the decode of a block of data, the LSM 18 reads the Input FIFO 28 to retrieve the Header of the block of image data to be processed. The Header, containing CODEC 24 control information, is then stored in the Control Register 36 and applied to the CODEC 24.

FIG. 2(a) shows an exemplary content of the Input FIFO 28 for an image data decode operation. As can be seen, the Header information is interspersed with blocks of image data and End of Block (EOB) identifiers.

FIG. 2(c) shows an exemplary content of the Address FIFO 34 of FIG. 2 for the Input FIFO 28 contents of FIG. 2(a).

Following this operation, the LSM 18 again reads the Input FIFO 28 to retrieve the first word of compressed data for the block. The CODEC 24 begins decoding the data and sends a READY indication to the LSM 18 for additional data. The LSM 18 continues to read the Input FIFO 28 in response to each CODEC 24 READY indication. The CODEC 24 identifies the EOB for a block of image data read from the Input FIFO 28 and indicates this condition to the LSM 18 by driving the EOB signal line. The LSM 18 delays until the decoded block of image data is transferred from the CODEC 24 to the Image Memory 22, and then repeats the above-described process if there are more blocks to be processed, as indicated by the state of the Address FIFO 34 EMPTY status signal line.

Figure 3:
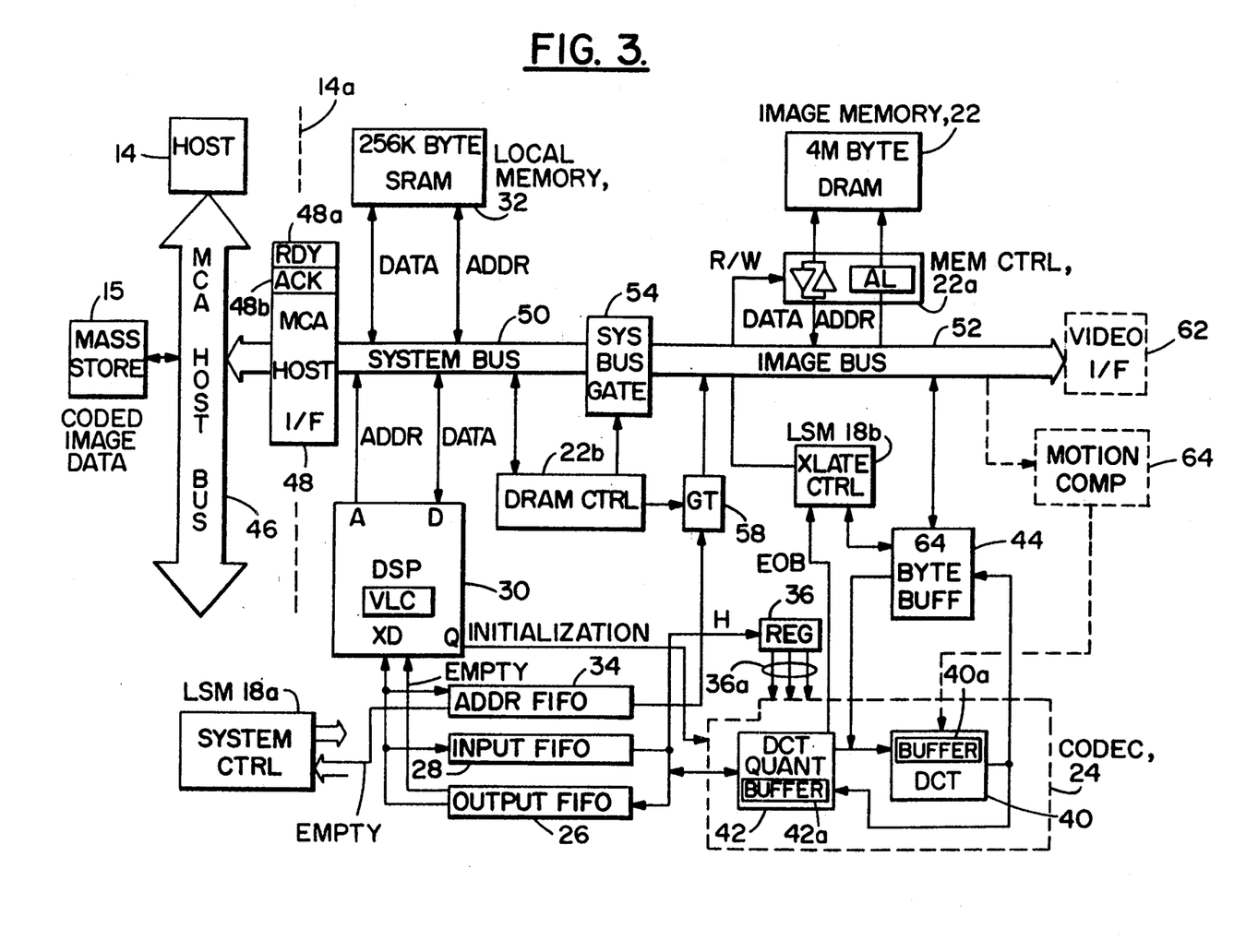
FIG. 3 is a detailed circuit block diagram of a presently preferred embodiment of the image data coding and decoding system shown in FIG. 1.

FIG. 3 is a detailed circuit block diagram of a presently preferred embodiment of the image data coding and decoding system shown in FIG. 1.

This embodiment of the invention is provided on a plug-in circuit card intended to be interfaced with a data processing system having a system bus that operates in accordance with the Micro Channel interface specification (Micro Channel is a registered Trademark of the International Business Machines Corporation of Armonk, N.Y.).

The circuit card contains three 1 Kbyte by 18 bit FIFOS 26, 28, and 34, and a 256 Kbyte Static Ram (SRAM) as the Local Memory 32. The circuit card also contains the local Processor 30, and two further processing devices (DCT 40, DCTQ 42) that comprise the CODEC 24. Devices 40 and 42 conform to the Joint Photographic Experts Group (JPEG) baseline specification.

In a presently preferred embodiment of the invention the DCT device 40 is a L64730 Discrete Cosine Transform Processor that is available from LSI Logic of Milepetas, Calif., and the DCTQ device 42 is a L64740 DCT Quantization Processor also available from LSI Logic. The construction and operation of the DCT 40 is described in a publication L64730 (July 1990), and the construction and operation of the DCTQ 42 is described in a publication L67440 (September 1990). These publications are also available from LSI Logic. Both of these devices includes internal data buffers (BUFF 40a and BUFF 42a). An external 64 byte translation buffer 44 operates in conjunction with the DCT 40 and the DCTQ 42, as described below.

Control logic is contained within Programmable Logic Devices (PLDs), specifically a SYSTEM CTRL LSM 18a and an XLATE CTRL LSM 18b. The circuit card functions to perform image data encode/decode specific processing.

The above described JPEG compression/decompression algorithm that is illustrated in FIG. 4 can be divided into three tasks.

1. The nonadaptive Discrete Cosine Transform (DCT) based on 8-by-8 blocks of image elements.

2. The uniform midstep quantization of the DCT coefficient using weighting functions that are optimized for human visual perception and compacted by Run Length Coding (RLC).

3. Huffman VLC (or RLC) to reduce the entropy of the quantized DCT coefficients.

The system illustrated in FIG. 3 partitions these tasks such that the DCT 40 performs the nonadaptive DCT function, the DCTQ 42 performs the quantization function and RLC, and the Processor 30 performs the VLC function.

In general, the VLC function that is executed by the Processor 30, when encoding image data, is a table lookup operation that corresponds to a mapping between source symbols and variable-length codewords. When decoding image data, VLC is generally accomplished by tracing along a coding tree until the decoded data is reached. The VLC coder maps the input data into variable-length codewords. As was noted above, for the baseline JPEG method that is employed in the presently preferred embodiment, the Huffman coder is used to reduce the entropy of quantized DCT coefficients.

For image data decoding, compressed image data is moved, under Host 14 control, from a Host bus 46, through a Host bus Interface 48 and, via a System Bus 50, to the local SRAM 32. The system bus 50 and an Image Bus 52 are both contained within the confines of the circuit card, and are coupled together through a System Bus Gate 54.

Synchronization of data transfers at a system resource interception boundary 14a is accomplished with two flags that are contained within the Interface 48. Specifically, a Ready (RDY) flag 48a is set by the Host 14 to indicate that a block of compressed image data has been stored in the SRAM 32. The RDY flag 48a is read by the Processor 30 and is used to initiate the decompression of the block of image data by the DCT 40 and the DCTQ 42. An Acknowledge (ACK) flag 48b is set by the Processor 30 to indicate that a block of compressed image data has been stored within the SRAM 32, at the termination of the encoding of a block of image data by the DCT 40 and the DCTQ 42. The ACK flag 48b is read by the Host 14 and is used to initiate the movement of the compressed block of image data to, by example, a mass storage device 15.

The local Processor 30 is embodied within a Digital Signal Processor (DSP) that performs interface functions, Header parsing on the compressed data stream, and VLC. One suitable embodiment for the DSP Processor 30 is a TMS320C30 device that is available from Texas Instruments. It should be realized that a Digital Signal Processor is not required to implement the invention, and that any digital data processor having the required speed and processing robustness may be employed. A Reduced Instruction Set (RISC) processor is another suitable processor-type.

DSP Processor 30 performs the VLC decompression function and composes blocks of RLC image data from the data stored within the SRAM 32. Processor 30 also produces a Header (H) for each block. The Header contains, on a per-block basis, setup data for the DCT device 40 and the DCTQ device 42. The resulting data blocks are transferred by the DSP Host 30 to the data input FIFO 28 as 16-bit words.

In accordance with the invention, each data block is preceded by its corresponding setup Header word, as shown in FIG. 2(a). Each block of data may include from one to 64 words of Run Length Coded image data.

The DSP Processor 30 first initializes the DCTQ 42 by loading internal quantization tables and then, for each block, provides an Image Memory 22 target address for the block. The target address is loaded into the address FIFO 34, as shown in FIG. 2(c). This address is later used to store the decompressed block of image data in the Image Memory 22.

The SYSTEM CTRL 18a initiates image data processing when it detects that at least one address is contained in the Address FIFO 34. This condition is indicated by the EMPTY status flag of the address FIFO 34 being deasserted when the Processor 30 loads the first block address.

In accordance with the invention, and in response to EMPTY being deasserted, the SYSTEM CTRL 18a reads the first block's Header from the Input FIFO 28 and stores the Header information in the register (REG) 36. REG 36 outputs control signals that are applied to the DCT device 40 and to the DCTQ device 42 to set their internal characteristics for processing the ensuing block data output from the Input FIFO 28.

Specifically, the DCTQ 42 receives four control bits from REG 36, the four bits being connected to the MODE.0, COMP0, COMP1, and RESPRED input terminals of the DCTQ 42. These terminals are used for controlling the following functions.

| MODE.0 | Selects one of two internal quantization tables |
| COMP0, COMP1 | Selects a DC predictor |
| RESPRED | Resets the internal DC predictors when high |

The DCT 40 receives one control bit from the REG 36, the control bit being connected to an INTER input terminal. The signal on this terminal, when high, indicates that the device is to operate in an inter-frame mode.

As such, it can be realized that the invention teaches the insertion of the CODEC 24 control information, on a block-by-block basis, into the input data buffer device.

Figure 5A:
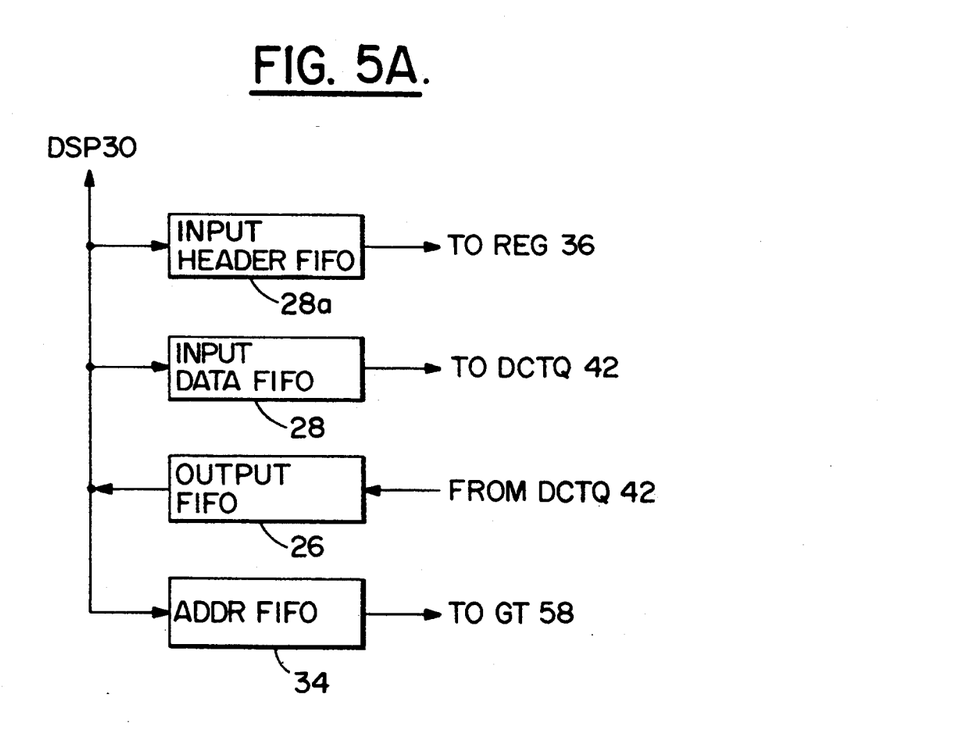
FIG. 5a shows, in accordance with a further embodiment of the invention, a portion of the image data coding and decoding system shown in FIG. 3.

In other embodiments of the invention, as illustrated in FIG. 5a, a separate buffer, shown as an Input Header FIFO 28a, is employed to enqueue the CODEC control information. In this embodiment, the FIFO 28a is read by the LSM 18a to extract a Header and to apply the Header to the CODEC 24. The image data is then output from the Input Data FIFO 28, as described above.

Figure 5B:
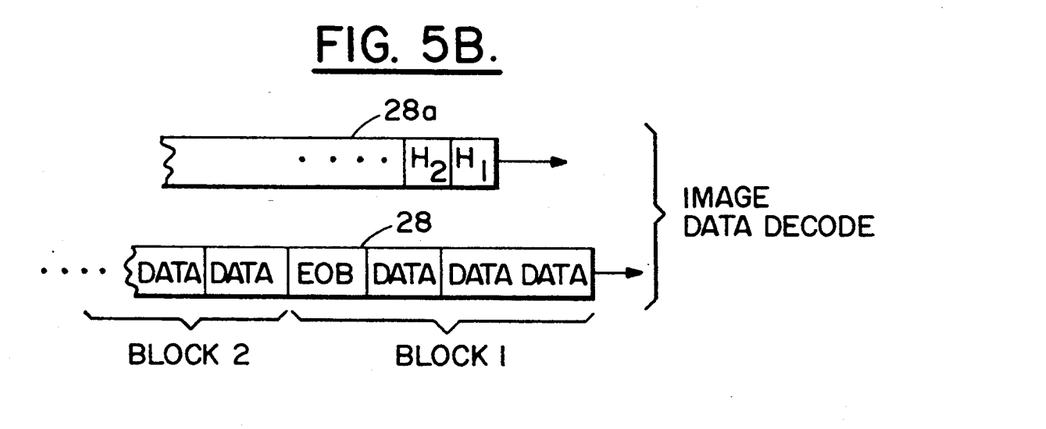
FIG. 5b illustrates the contents of the Input Header FIFO and the Input Data FIFO of FIG. 5a for an image data decode operation.

FIG. 5b shows the contents of the Input Header FIFO 28a and the Input Data FIFO 28 for an image data decode operation. As can be seen, a first block of image data (Block 1) has a Header (H1) associated therewith, a second block of image data (Block 2) has a Header (H2) associated therewith, and so forth.

For each of the illustrated embodiments, the teaching of the invention provides an image data stream that is partitioned into blocks of image data, with each image data block having processing control information expressed in a processing control block, or Header, that progresses though a processing-pipeline with the associated image data block. The Header for each image data block specifies processing control information for controlling the processing of the entire block of image data.

In operation, the DCTQ device 42 produces 64 coefficients per data block which, after passing through the DCT device 40, become 64 bytes of decoded image data. In that the DCT device 40 produces a scrambled (but consistent) ordering of the output data, a translation is performed by the data buffer 44. This translation is accomplished by the XLATE CTRL 18b controlling the address inputs of the data buffer 44 so as to store the decoded image data in a desired order. The reordered 64 bytes of decoded image data are then stored within the Image Memory 22, beginning at the address contained in the Address FIFO 34. This address is applied through a Gate (GT) 58 to the address bus (ADDR) portion of the Image Bus 52, and is latched in an Address Latch (AL) contained within a Memory Controller (MEM CTRL) 22a. The contents of the AL are automatically incremented so as to store the entire 64 byte decoded data block. A Dynamic RAM Controller (DRAM CTRL) 60 controls the timing of the accessing of the 4 Mbytes of Dynamic RAM that comprise the Image Memory 22.

This process continues until the Address FIFO 34 becomes EMPTY, indicating that there are no further blocks of compressed image data to process.

For image data encoding, source images are contained in the Image Memory 22. The source images may be obtained from, by example, a camera that generates image data at 30 frames per second. The DSP Processor 30 prepares the circuit card for encode processing by loading the Input FIFO 28 with DCT and DCTQ setup Headers for each block (FIG. 2(b)), loading the DCTQ 42 with the appropriate quantization tables, and loading the Address FIFO 34 with Image Memory 22 target addresses for each block (FIG. (d)).

The SYSTEM CTRL 18a initiates the encode process when it detects the presence of at least one address in the Address FIFO 34. The SYSTEM CTRL 18a reads the first address from the Address FIFO 34 and transfers the address to the Address Latch of the Memory Control 22a. Subsequently, the SYSTEM CTRL 18a initiates the access of the corresponding block of image data in the Image Memory 22.

In accordance with the invention, the SYSTEM CTRL 18a then reads the first block's Header from the Input FIFO 28 and stores the Header in REG 36. The stored Header information is applied to the DCT 40 and the DCTQ 42 to control encode processing parameters for the image block, as described above. Image data is read, under control of the XLATE CTRL 18b, from the Image Memory 22 into the buffer 44, which then passes 64 byte blocks to the DCT 40, also under control of the XLATE CTRL 18b. In the encode mode, the buffer 44 provides synchronization of the input data stream to both the DCT 40 and DCTQ 42. Coefficients output by the DCT 40 pass through the DCTQ 42 and become a stream of compressed 16-bit image "events". The image "events" are stored in the Output FIFO 26 for subsequent retrieval and VLC by the DSP Processor 30. The DSP Processor 30 has an input coupled to the EMPTY flag of the Output FIFO 26 for detecting when the first byte of compressed image data is stored therein.

So long as an address is present in the Address FIFO 34, the SYSTEM CTRL 18a continues to control of reading of block addresses from the Address FIFO 34 and block Headers from the Input FIFO 28, as well as the writing of encoded image block data to the Output FIFO 26.

As can be seen, the SYSTEM CTRL 18a is triggered by the presence of the first address to initiate the local processing of image data, and continues to control the processing of image data so long as an image data block address exists within the Address FIFO 34. Thus, the use of the Address FIFO EMPTY status flag decouples the operation of the fixed processing cycle Stages (DCTQ 42 and DCT 40) from the variable processing cycle Stage embodied in the Processor 30. Similarly, the use of the EMPTY status flag of the Output FIFO 26 decouples the Processor 30 from the fixed cycle DCT and DCTQ stages. Furthermore, in conjunction with the operation of the Processor 30, all image data processing (coding and decoding) is performed asynchronously to, and in parallel with, other processing tasks that may be performed by the Host 14.

It should also be realized that although the description has focussed on the processing of a single block of data, that during normal operation a number of blocks are typically moving through the process-pipeline. For example, compressed image data is stored within the SRAM 32 awaiting decompression, the Processor 30 is performing the VLC operation on a data block being prepared for decompression, one or more data blocks already VLC'd by the Processor 30 are enqueued within the Input FIFO 28, and the CODEC 24 is decoding a current data block in accordance with the Header information that is associated with the current data block.

In accordance with a first process of the invention, there is provided a method for sequentially processing a plurality of data blocks. The method includes the steps of (a) storing within a first buffer each of a plurality of blocks of data that are to be processed, each of the blocks of data being stored so as to have control information stored therewith; (b) reading out from the first buffer the control information associated with a first one of the data blocks; (c) inputting the read-out control information to a processing device that is to process the data blocks; (d) reading out from the first buffer the first one of the data blocks and inputting the first one of the data blocks to the processing device; and (e) processing, with the processing device and in accordance with the control information, the first one of the data blocks.

The step of storing includes a further step of storing in a second buffer a memory address that identifies an initial memory address of a block of memory addresses at which the processed block of data is to be stored at the completion of the step of processing.

The step of reading out the control information is not executed until the occurrence of the step of storing the memory address.

In accordance with a second process of the invention, there is provided a method for sequentially processing a plurality of data blocks. The method includes the steps (a) storing within a first buffer individual ones of a plurality of processing control words, each of the processing control words being associated with one of a plurality of data blocks that are stored within a memory; (b) storing within a second buffer individual ones of a plurality of addresses each of which identifies an initial address of a block of memory means addresses at which a block of data is stored; (c) reading out from the first buffer the processing control word associated with a first one of the data blocks; (d) inputting the read-out processing control word to a processing device that is to process the data blocks; (e) reading out from the second buffer the address associated with a first one of the data blocks; (f) reading out from the memory, beginning at the address read out from the second buffer, the first one of the data blocks and inputting the first one of the data blocks to the processing device; and (g) processing with the processing device, in accordance with the processing control word, the first one of the data blocks.

The step of reading out the processing control word is not executed until the step (b) stores at least one address.

Although described above in the context of a system for compressing and decompressing blocks of image data in real time, the use of embedded process control information may be applied to data processing applications other than image processing. Also, a number of modifications may be made to the presently preferred embodiment of the invention that is shown in FIGS. 3 and 5. For example, the operation of the image processing system may be enhanced with the addition of a block 64 that performs motion compensation in accordance with the MPEG (Motion Picture Experts Group) standard. For this enhancement, two frames of image data that are stored within the Image Memory 22 are subtracted and are processed by the DCT 40. Also, other functions may be provided by coupling a video Interface 62 to the image bus 52, and exporting and importing image data through the video interface 62. These other functions may include, and are not limited to, image scaling, color conversion, filtering, rotation, recomposition, and depth cueing. Similarly, the DCT 40 and the DCTQ 42 may be replaced by other image processing circuitry to perform functions other than image data encoding and decoding, with the Header (H) information specifying the characteristics of these other processing tasks on a block by block basis.

Thus, while the invention has been particularly shown and described with respect to preferred embodiments thereof, it will be understood by those skilled in the art that changes in form and details may be made therein without departing from the scope and spirit of the invention.

Having thus described our invention, what we claim as new, and desire to secure by Letters Patent is:

1. Apparatus for sequentially processing a plurality of data blocks, comprising:

means for processing a block of data; and means for buffering a plurality of blocks of data to be sequentially processed by said processing means, said data block buffering means having an output coupled to an input of said processing means for outputting a buffered block of data to said processing means, said data block buffering means further including means for buffering and outputting, in association with individual ones of the buffered blocks of data, control information for specifying to said processing means at least one processing control function for controlling the processing of the associated block of data.

2. Apparatus as set forth in claim 1 and further including:

storage means, having an input coupled to an output of said buffering means and an output coupled to control terminals of said processing means, for storing the control information output from said buffering and outputting means, prior to the processing of an associated block of data, and for applying the stored information to said control terminals of said processing means during the processing of the associated block of data.

3. Apparatus as set forth in claim 1 wherein each of the blocks of data contains image data, and wherein said processing means includes means for selectively compressing or decompressing each of the blocks of image data in accordance with the control information associated with each of the blocks of data.

4. Apparatus as set forth in claim 3 wherein said processing means includes means for executing, in cooperation with said control information, a Discrete Cosine Transformation Process on each of the blocks of image data, said processing means further including means for executing, in cooperation with said control information, a Discrete Cosine Transformation Quantization Process on each of the blocks of image data.

5. Apparatus as set forth in claim 4 wherein the control information includes information for specifying, to said means for executing a Discrete Cosine Transformation Quantization Process, one of a plurality of quantization tables to be employed when processing the associated block of image data.

6. An image data processing system, comprising:
a sequential process-pipeline comprised of a plurality of processing stages each of which includes means for executing a Process on image data organized as image data blocks, said plurality of processing stages being serially coupled one to another for passing image data blocks therebetween, a first one of said processing stages being coupled to a data processing system for inputting compressed image data from and for outputting compressed image data to the data processing system; wherein
said first one of said processing stages is coupled to a second one of said processing stages through a buffer means that includes an image data input buffer means for storing at least one image data block, said buffer means further including means for buffering, in association with each stored image data block, control information for specifying processing control information to said second processing stage for controlling the processing of the associated image data block.

7. An image data processing system as set forth in claim 6 wherein said buffer means includes an address buffer means, wherein said second one of said processing stages is further coupled to a third processing stage, said second and third processing stages each including means for performing a decompression Process on a stored block of image data; wherein said processing means of said first processing stage stores at least one block of compressed image data within said image data input buffer means and an address within said address buffer means, the address identifying an initial address of a block of addresses within an image memory means wherein decompressed image data resulting from the processing of a stored block of image data is to be stored at the completion of the decompression Process.

8. An image data processing system as set forth in claim 7 and further comprising means, responsive to the storage of the address within said address buffer means, for initiating said processing means of said second and said third processing stages to perform the decompression Process on the block of image data stored within said image data input buffer means.

9. An image data processing system as set forth in claim 8 wherein said processing means of said first processing stage also stores the control information in said buffer means, the stored control information specifying decompression Process control information to said processing means of said second and said third processing stages for an associated one of a block of image data stored within said image data input buffer means, and wherein said initiating means further includes means for reading out the stored control information and for applying the read-out control information to said processing means of said second and said third processing stages.

10. An image data processing system as set forth in claim 6 wherein said buffer means further includes an address buffer means, wherein said second one of said processing stages is further coupled to a third processing stage, said second and third processing stages each including means for performing a compression Process on a block of image data; wherein said processing means of said first processing stage stores the control information in said buffer means for specifying compression Process control information, for an associated one of a block of image data stored within said image data input buffer means, to said processing means of said second and said third processing stages, said processing means of said first stage further storing an address within said address buffer means, the address identifying an initial address of a block of addresses, within an image memory means, wherein is stored a decompressed block of image data that is to be compressed.

11. An image data processing system as set forth in claim 10 and further comprising means, responsive to the storage of the address within said address buffer means, for initiating said processing means of said second and said third processing stages to perform the compression Process on the block of image data stored within said image data input buffer means.

12. An image data processing system as set forth in claim 10 wherein said buffer means further includes an image data output buffer means, and wherein said processing means of said second processing stage stores the compressed block of image data into said image data output buffer means, and wherein said processing means of said first processing stage is responsive to the storage of the block of compressed image data within said image data output buffer means to read out said stored block of compressed image data.

13. An image data processing system as set forth in claim 6 wherein said second one of said processing stages is further coupled to a third processing stage, and wherein:
said third processing stage executes a Discrete Cosine Transformation Process on a block of image data; and
said second processing stage executes a Discrete Cosine Transformation Quantization Process on a block of image data; wherein
the control information stored within said buffer means includes information for specifying, to said means for executing a Discrete Cosine Transformation Quantization Process, one of a plurality of quantization tables to be employed when processing the associated block of image data.

14. An image data processing system, comprising:
means for interfacing said image processing system to a Host data processing system, said interface means including a memory buffer means for storing encoded image data that is received from, and that is output to, the Host data processing system;

first processor means coupled to said memory buffer means for composing into blocks of encoded image data the encoded image data that is received from the Host data processing system, said first processor means further providing, in association with each of said blocks of encoded image data, control information for specifying processing control information for use in decoding an associated block of encoded image data;

first buffer means coupled to an output of said first processor means, said first buffer means including a first image data buffer means for storinq the encoded blocks of image data and also a control buffer means for storing the control information associated with each of the encoded blocks of image data;.

second image data buffer means for storing decoded image data;

means for encoding and decoding (CODEC) blocks of image data, said CODEC means being interposed between said second image data buffer means and said first buffer means, said CODEC means being coupled to said first processor means through said first image data buffer means and said control buffer means; and control means for reading out of the control buffer means the control information associated with a block of encoded image data stored within said first image data buffer means, for applying the read-out control information to the CODEC means, and for initiating said CODEC means to decode the associated stored block of encoded image data in accordance with the applied control information.

15. An image data processing system as set forth in claim 14 wherein said first buffer means further includes an address buffer means, wherein said first processing means stores at least one block of encoded image data within said first image data buffer means, stores within said control buffer means the control information associated with said at least one block of encoded image data that is stored in said first image data buffer means, and stores an address within said address buffer means, the address identifying an initial address of a block of addresses within said image memory means wherein the decoded image data is to be stored at the completion of the operation of said CODEC means in decoding the at least one block of encoded image data.

16. An image data processing system as set forth in claim 15 wherein said control means is responsive to the storage of the address within said address buffer means for reading out of the control buffer means the control information associated with a block of encoded image data, for applying the read out information to the CODEC means, and for initiating said CODEC means to decode the block of encoded image data in accordance with the information.

17. An image data processing system as set forth in claim 14 wherein said first buffer means includes a First In-First Out (FIFO) buffer means, wherein said first processing means stores the control information within said FIFO buffer means for specifying, for a block of encoded image data, image data block decoding control information to said CODEC means, and wherein said first processing means also stores the associated block of encoded image data within said FIFO buffer means.

18. An image processing system as set forth in claim 14 and further comprising:

address buffer means, forming a portion of said first buffer means, for storing for each stored block of encoded image data an initial address of a block of addresses within said image memory means wherein the decoded image data is to be stored at the completion of the operation of said CODEC means in decoding the an associated block of encoded image data;

wherein said first buffer means includes a First In-First Out (FIFO) buffer means, wherein said first processing means stores the control information within said FIFO buffer means for specifying, for a block of encoded image data, image data block decoding control information to said CODEC means, and wherein said first processing means also stores the associated block of encoded image data within said FIFO buffer means adjacent to the stored control information;

wherein said control means is responsive to the storage of an address within said address buffer means for initiating said CODEC means to decode an associated block of image data stored within said FIFO buffer means, and wherein said control means further includes means for first reading out the associated control information from said FIFO buffer means and for applying the read-out control information to said CODEC means prior to the operation of said CODEC means in reading out and decoding the associated block of encoded image data within said FIFO buffer means.

19. An image data processing system as set forth in claim 14 wherein said first buffer means further includes an address buffer means, and wherein said first processing means stores information in said control buffer means for specifying encoding control information to said CODEC means and also stores an address within said address buffer means, the address identifying an initial address of a block of addresses, within said memory buffer means, wherein is stored a decoded block of image data that is to be encoded.

20. An image data processing system as set forth in claim 19 wherein said control means is responsive to the storage of the address within said address buffer means for reading out of the control buffer means the control information associated with a block of encoded image data, for applying the read out control information to the CODEC means, and for initiating said CODEC means to encode the block of decoded image data in accordance with the control information.

21. An image data processing system as set forth in claim 14 wherein said CODEC means includes:

a second processing means for executing a Discrete Cosine Transformation Process on a block of image data; and a third processing means for executing a Discrete Cosine Transformation Quantization Process on a block of image data; wherein the control information includes information for specifying, to said means for executing a Discrete Cosine Transformation Quantization Process, one of a plurality of quantization tables to be employed when processing the associated block of image data.

22. A method for sequentially processing a plurality of data blocks that represent a displayable image, comprising the steps of:

(a) storing within a first buffer means individual ones of a sequence of blocks of data that are to be processed in accordance with at least one predetermined transformation, each of the individual ones of the blocks of data being stored so as to have transformation control information stored therewith;

(b) reading out from the first buffer means the transformation control information associated with a first one of the .Sequence of stored data blocks;

(c) inputting the read-out transformation control information to processing means that is to process the stored sequence of data blocks in accordance with the at least one predetermined transformation;

(d) reading out from the first buffer means the first one of the data blocks and inputting the first one of the data blocks to the processing means;

(e) processing with the processing means, in accordance with the transformation control information, the first one of the data blocks;

(f) reading out from the first buffer means the transformation control information associated with a next sequential one of the stored data blocks;

(g) inputting the read-out transformation control information to the processing means;

(h) reading out from the first buffer means the next sequential one of the data blocks and inputting the next sequential one of the data blocks to the processing means; and (i) processing with the processing means, in accordance with the transformation control information, the next sequential one of the data blocks.

23. A method as set forth in claim 22 wherein the step of storing includes a further step of storing a memory address in a second buffer means for each individual one of the stored sequence of data blocks, each stored memory address identifying an initial memory address of a block of memory addresses at which a processed data block is to be stored at the completion of the step of processing.

24. A method as set forth in claim 23 wherein the step of reading out the transformation control information is not executed until the occurrence of the step of storing at least one memory address.

25. A method as set forth in claim 22 wherein each of the stored sequence of data blocks is comprised of encoded image data, and wherein the step of processing decodes the image data by the steps of:

executing a Discrete Cosine Transformation Process on each of the stored sequence of data blocks; and executing a Discrete Cosine Transformation Quantization Process on each of the stored sequence of data blocks.

26. A method as set forth in claim 23 wherein the steps (f) through (i) are repetitively executed until the second buffer means has no further memory addresses stored within.

27. A method for sequentially processing a plurality of data blocks, comprising the steps of:

(a) storing within a first buffer means individual ones of a sequence of processing control words, each of the processing control words being associated with one of a sequence of data blocks that are stored within a memory means;

(b) storing within a second buffer means individual ones of a sequence of addresses each of which identifies an initial address of a block of memory means addresses at which an associated one of the sequence of data blocks is stored;

(c) reading out from the first buffer means the processing control word associated with a first one of the sequence of data blocks;

(d) inputting the read-out processing control word to a processing means that is to process the sequence of data blocks;

(e) reading out from the second buffer means the address associated with the first one of the sequence of data blocks;

(f) reading out from the memory means, beginning at the address read out from the second buffer means, the first one of the sequence of data blocks and inputting the first one of the sequence of data blocks to the processing means; and (g) processing with the processing means, in accordance with the processing control word, the first one of the sequence of data blocks.

28. A method as set forth in claim 27 wherein the step (c) of reading out the processing control word is not executed until the step (b) stores at least one address.

29. A method as set forth in claim 27 wherein each of the sequence of data blocks is comprised of uncompressed image data, and wherein the step of processing compresses in turn each of the sequence of blocks of uncompressed image data by the steps of:

executing a Discrete Cosine Transformation Process on the block of image data; and executing a Discrete Cosine Transformation Quantization Process on the block of image data.

30. A method as set forth in claim 27 wherein the steps (c) through (g) are repetitively executed for each succeeding one of the sequence of data blocks until the second buffer means has no further addresses stored within.

* * * * *